(12) United States Patent
Cairns et al.

(10) Patent No.: US 6,321,021 B1
(45) Date of Patent: Nov. 20, 2001

(54) END SEAL ASSEMBLY FOR TUBULAR CONDUIT

(75) Inventors: James L. Cairns; Stewart M. Barlow; Peter R. Baxter, all of Ormond Beach; Steven J. Kowalcky; William S. Taylor, both of Edgewater, all of FL (US)

(73) Assignee: Ocean Design, Inc., Ormond Beach, FL (US)

( * ) Notice: Subject to any disclaimer, the term of this patent is extended or adjusted under 35 U.S.C. 154(b) by 0 days.

(21) Appl. No.: 09/351,538

(22) Filed: Jul. 12, 1999

(51) Int. Cl.[7] .................................................. G02B 6/00
(52) U.S. Cl. .................. 385/138; 439/274; 439/275; 439/587; 385/135
(58) Field of Search ................... 385/58, 135–139; 439/135–139, 274, 275, 279, 587; 174/70 R

(56) References Cited

U.S. PATENT DOCUMENTS

| | | |
|---|---|---|
| 4,123,138 | 10/1978 | Morrison . |
| 4,203,640 | 5/1980 | Bice et al. . |
| 4,325,607 | 4/1982 | Carlsen . |
| 4,531,810 | 7/1985 | Carlsen . |
| 4,606,603 | 8/1986 | Cairns . |
| 4,666,242 | 5/1987 | Cairns . |
| 4,668,045 | 5/1987 | Melman et al. . |
| 4,682,848 | 7/1987 | Cairns et al. . |
| 4,759,601 | * 7/1988 | Knutsen et al. ................ 385/61 |
| 4,826,276 | * 5/1989 | Abbott et al. .................. 385/138 |
| 4,921,322 | * 5/1990 | Seike et al. .................... 385/138 |
| 4,959,022 | 9/1990 | Neuroth . |
| 5,024,503 | * 6/1991 | Gunn et al. ..................... 385/53 |
| 5,113,475 | 5/1992 | Baker . |
| 5,151,967 | * 9/1992 | Ebinuma ......................... 385/138 |
| 5,155,795 | 10/1992 | Wasserman et al. . |
| 5,450,519 | 9/1995 | Iwanski et al. . |
| 5,521,998 | 5/1996 | Walles et al. . |
| 5,585,914 | 12/1996 | Yamasaki et al. . |
| 5,588,086 | 12/1996 | Fan . |
| 5,644,673 | 7/1997 | Patterson . |
| 5,873,750 | * 2/1999 | Cairns et al. ................... 439/587 |

* cited by examiner

*Primary Examiner*—Hemang Sanghavi
*Assistant Examiner*—Omar Rojas
(74) *Attorney, Agent, or Firm*—Brown, Martin, Haller & McClain, LLP

(57) ABSTRACT

An end seal assembly is mounted in a conduit or feedthrough body with a through bore of stepped diameter between its ends into which a fiber or wire-carrying metal cable extends. An inner end of the cable is stopped against a shoulder in the through bore, with at least one fiber or wire extending from the cable end out through the second end of the seal body. An end seal is seated at the outlet end of the seal body and has a through bore through which the or each fiber extends. The through bore is filled with epoxy material. The end seal is of a material having a coefficient of thermal expansion approximately equal to that of the epoxy material.

16 Claims, 2 Drawing Sheets

END SEAL ASSEMBLY FOR TUBULAR CONDUIT

BACKGROUND OF THE INVENTION

The present invention relates to an end seal assembly for sealing the end of a conduit or passageway carrying multiple conductors such as optical fibers or wires or a feedthrough for optical fibers or wires into an enclosure or through a bulkhead, for example. The end seal assembly is particularly designed for underwater or other high pressure applications.

Modern communications systems, particularly those employing optical fibers as conductors, often require means for passing said conductors sealably through high-pressure barriers such as instrumentation housings. One such means has been to provide rigid metal bores through which the conductors pass and into which they are sealably restrained by epoxy potting material. One drawback to using epoxy potted directly into metal bores is that the two materials have different bulk moduli and thermal expansion coefficients. As a result, cracking of the epoxy, or separation of the epoxy-metal interface often occurs with thermal and/or pressure cycling.

A particular subset of feed-through applications involves the common use of rigid tubes, or cables, to contain and protect fibers. These may be incorporated within more complex cables. Sometimes these tubes or cables contain multiple fibers. Some cables are simply empty except for the fibers. Others are filled with gel. Such cables or tubes are typically of small diameter (1/10 inch or so). In gel-filled cables, the gel will expand or contract from the ends of the tube under changing pressure and temperature if it is not sealed, which will strain the fibers and potentially cause them to bend or break.

The ends of conductor-bearing cables, in practice, are usually terminated to fiber management chambers associated with connectors or instrument/equipment canisters. It is generally desirable to physically isolate the inside of the cables from these enclosures, both to preclude the exchange of fluid/gel between them, and to prevent the migration of fiber from the tube to the enclosure or vice versa. However, this can be difficult to achieve in a small size cable carrying multiple, very fine fibers or wires.

In application Ser. No. 08/856,928 of Cairns et al., filed May 15, 1997, an underwater bulkhead feedthrough assembly is described in which optical fibers or electrical wires are fed from the end of an underwater cable through a bulkhead into an enclosure or equipment housing. The cable end is coupled to one end of a connector body, and the individual fibers or wires extend through a bore in the body and a seal assembly within the body. This assembly is suitable for many applications, but is difficult to assemble for small tubes with closely packed fibers or wires.

SUMMARY OF THE INVENTION

It is an object of this invention to provide an epoxy feed through seal which is resistant to cracking and separation of the epoxy as a result of thermal and/or pressure cycling.

It is a further object of the present invention to provide a new and improved end seal assembly for tubular conduits carrying optical fibers or electrical wires, which will sealably cap off the conduit while allowing the fibers to pass through into an instrument housing or the like, the interior of the housing being of an unequal pressure with respect to the interior of the conduit.

A third object of the invention is to provide a miniature version of a conduit end seal having a size commensurate with the conduit diameter.

According to the present invention, a conduit end seal assembly is provided, which comprises an end seal for seating in a seat portion in a conduit carrying one or more conductors, the end seal having a second through bore through which the conductors (fibers or wires) extend, the through bore being filled with epoxy material bonded to the inner surface of the end seal through bore and to the wires or fibers, and the end seal being of a material having coefficients of thermal expansion and compressibility approximately equal to the respective thermal expansion and compressibility coefficients of the epoxy material.

In a preferred embodiment of the invention, the material of the end seal is a thermoplastic material such as glass fiber reinforced plastic which has a coefficient of thermal expansion and a bulk modulus similar to that of the epoxy material filling the through bore and surrounding the fibers. The end seal is not necessarily a tight or sealing fit in the seat portion, and one or more resilient seal members may be mounted between the end seal and seat portion to provide a seal. The resilient seal member will compensate for any differences in thermal expansion or contraction between the seal body and end seal.

This arrangement avoids the problem of potential loss of the seal as a result of thermal shock or pressure cycling with subsequent separation between epoxy and metal surfaces. The provision of an end seal between the metal and epoxy, with the seal being of a material having a coefficient of thermal expansion and a compressivity substantially equal to that of the epoxy, ensures that the epoxy does not separate from the inner surface of the bore in the end seal. At the same time, the resilient seal member between the outer surface of the end seal and the seat portion will accommodate any difference in thermal or pressure induced expansion or contraction between the end seal and the metal seal body, ensuring an effective seal.

BRIEF DESCRIPTION OF THE DRAWINGS

The present invention will be better understood from the following detailed description of some preferred embodiments of the invention, taken in conjunction with the accompanying drawings in which like reference numerals refer to like parts and in which.

DESCRIPTION OF THE PREFERRED EMBODIMENT

Figure 5:
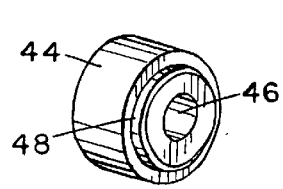
FIG. 5 is a perspective view of the jam bushing component.
Figure 6:
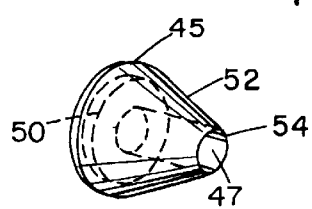
FIG. 6 is a perspective view of the grip bushing.
Figure 7:
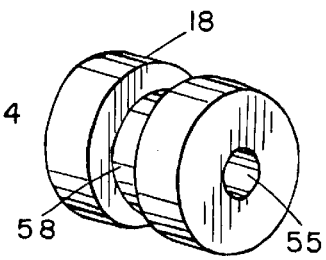
FIG. 7 is a perspective view of the feed-through end seal.

FIGS. 1 to 4 of the drawings illustrate an end seal assembly 10 according to a first embodiment of the invention, while FIGS. 5 to 7 illustrate some individual parts of the assembly in more detail. The assembly 10 basically comprises a connector body or conduit 12 with a through bore of stepped diameter, a first nut or connector 14 releasably connected to one end of the seal body 12, and a second, retainer nut 16 at the second end of the seal body 12 for holding a feedthrough seal member or end seal 18 in the bore at that end of the body or conduit 12.

Figure 8:
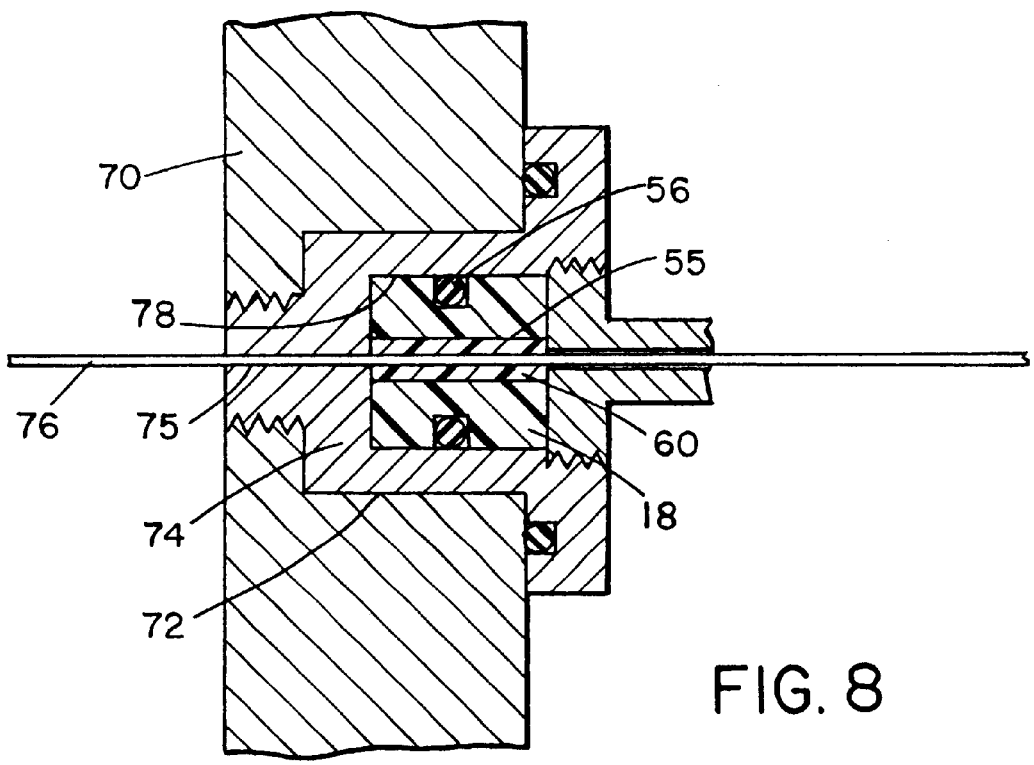
FIG. 8 is a longitudinal sectional view of a bulkhead feedthrough incorporating the end seal assembly according to another embodiment of the invention.

In the illustrated embodiment, the body 12 includes a central portion 20 of hexagonal shape, with a first cylindrical projection 22 at one end having outer screw threads 24 and a second cylindrical projection 25 at the opposite end, also with external screw threads 26. The first nut or tubing gland nut 14 is threadably engaged over the threads 24 on the first projection 22, while the retainer nut 16 is threadably engaged over the threads 26 on the second projection 25. However, the body 12 may alternatively comprise a simple tubular conduit or a feedthrough connector through a high pressure barrier into an instrument housing or the like. In this case, body 20 may be threaded into a suitable bore through the wall or lid of an instrument housing, with a flange at one end for bearing against the wall, as indicated in FIG. 8.

Figure 1:
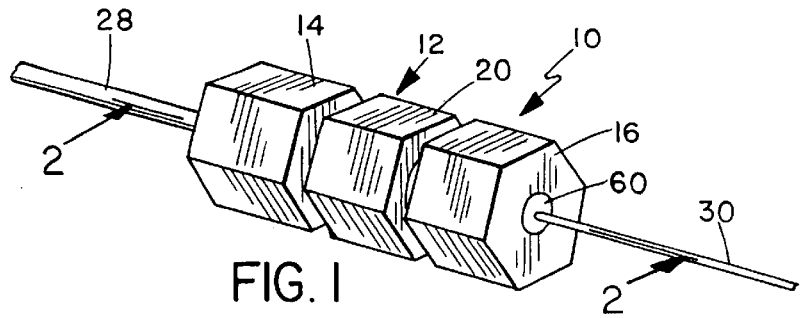
FIG. 1 is a perspective view of the seal assembly according to a first embodiment of the invention.
Figure 2:
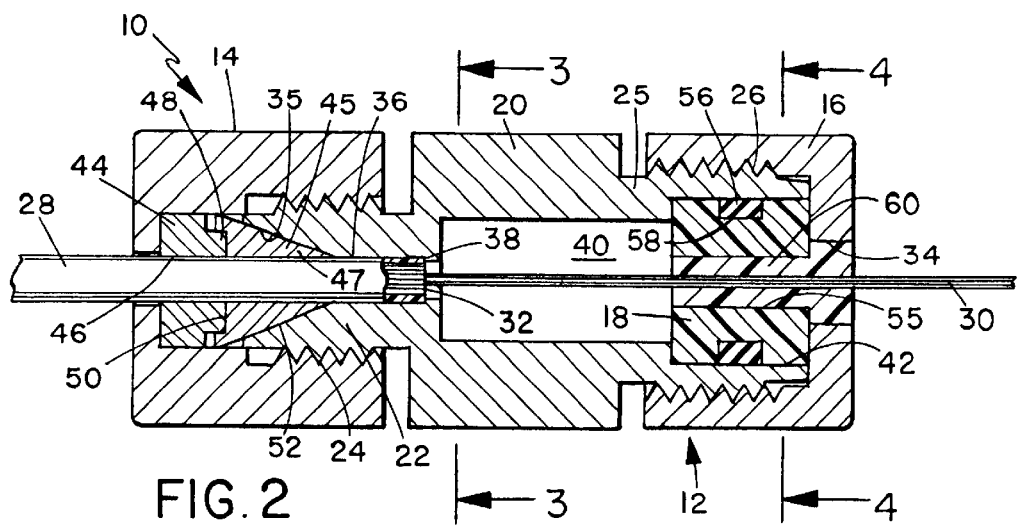
FIG. 2 is an enlarged sectional view taken on line 2—2 of FIG. 1.
Figure 3:
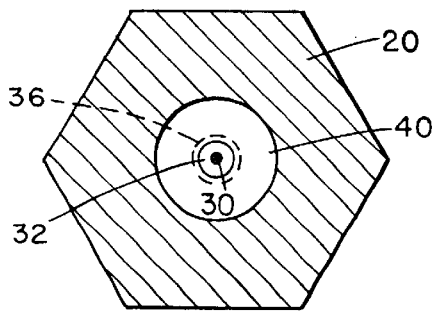
FIG. 3 is a sectional view taken on line 3—3 of FIG. 2.
Figure 4:
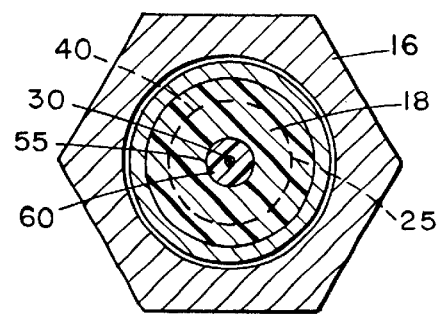
FIG. 4 is a sectional view taken on line 4—4 of FIG. 2.

An outer tube or rigid cable 28 carrying a bundle 30 of conductors such as optical fibers or very fine electrical wires extends into the through bore in seal body 12 through an aligned opening in the first nut 14, as best illustrated in FIG. 2. The tube 28 has an inner end 32 which terminates in the seal body, while the fibers or wires 30 extend on out through the opposite end of the seal body and through an aligned opening 34 in the seal retainer nut 16. The through bore in the seal body is of stepped diameter, and has a conically tapered portion 35 at the inlet of the seal body, followed by a cylindrical bore portion 36 of diameter substantially matching that of the tube 28. Bore portion 36 terminates at a reduced diameter shoulder 38 forming an end stop for the inner end 32 of tube 28, and shoulder 38 is followed by a larger diameter bore portion 40, and a larger diameter seat 42 at the outer end of the seal body for seating the end seal 18.

A sealed grip assembly is provided between the fastener nut 14 and the cable at the first end of the seal body. The grip assembly comprises a jam bushing 44 and a grip bushing 45. Bushings 44,45 are jammed between the end wall of nut 14 and the tapered bore portion 35 at the inlet end of the seal body. The jam bushing 44 and grip bushing 45 are illustrated in more detail in FIGS. 5 and 6, respectively. Each bushing is of a stainless steel or other rigid material, and has a through bore 46,47, respectively, which is a close fit over the tube 28. Jam bushing 44 is cylindrical, with a reduced diameter projection 48 at one end which fits into an annular recess 50 at the corresponding end of the grip bushing 45 to hold these parts together. The grip bushing 45 has a conical, tapered outer surface 52 with a taper substantially matching that of the tapered bore portion 35, and a pointed end 54 for sealably biting into the outer surface of the tube 28 as the nut 14 is tightened. Thus, as nut 14 is tightened on threads 24, the jam bushing 44 will be pushed inwardly towards the seal body, and will in turn push the grip bushing 45 further into the tapered bore portion 35. This in turn will cause the pointed end 54 of the bushing to bite down into the outer surface of the tube 28, forming both a grip and a water tight seal between the end nut, seal body, and the tube 28. Thus, the cable or tube carrying the optical fibers or fine wires is held securely in position in the seal body, and at the same time, the inlet end of the seal body is sealed against entry of water into the through bore.

The end seal or feedthrough seal member 18 is illustrated in more detail in FIG. 7. Seal member 18 is seated in seat 42 in seal body 12, and has a central through bore 55 through which the fibers or wires 30 project. A suitable resilient seal such as an O-ring seal 56 or a gland-type seal is mounted in an annular groove 58 on the outer surface of seal member 18, to form a seal between seal member 18 and the inner surface of seat 42, as illustrated in FIG. 2. The through bore 55 is filled with a suitable epoxy material 60 which bonds to the inner surface of the bore 55 and also to each of the fibers, sealing through bore 55. The seal member 18 is of a material having a coefficient of thermal expansion and a bulk modulus substantially equal to that of the epoxy material 60 filling bore 55. This means that any thermal expansion or contraction in the epoxy material will be substantially matched by corresponding expansion or contraction of the seal member 18, reducing the risk of any separation between the mating surfaces of the epoxy material and through bore 55. At the same time, the seal body and epoxy material have substantially matching compressibility, further reducing the risk of any loss of the sealing contact between the mating surfaces. The seal member is preferably of glass fiber filled plastic or thermoplastic material, and in a preferred embodiment of the invention polyaryletheretherketone was used for the seal member. This material is available commercially as glass fiber-filled PEEK® resin, manufactured by Victrex USA Inc., of West Chester, Pa.

The seal member 18 is therefore of substantially rigid material, and the O-ring seal 56 will provide a water tight seal between the outer surface of seal member 18 and the inner surface of seat 42. This avoids the problems in previous feed through seal arrangements where a metal feedthrough was filled with epoxy, and often did not maintain its sealing properties after thermal shocks or the like.

The end seal assembly of this invention provides an effective seal at both ends of a feedthrough fitting for sealing the end of a conduit carrying one or multiple, very fine optical fibers or wires which are fed from the cable end and into a housing for connection to various components. The exposed end of the cable containing gel faces a sealed bore portion in the seal body, and is therefore not affected by any high pressure differentials which may cause contraction and potential damage to the fibers. The interior of the seal body forms an elongated sealed pressure chamber providing a protected feedthrough for optical fibers or fine electrical wires. The chamber is completely sealed from the outside environment at both ends of the seal body, protecting the fibers against potential damage as they exit the conduit.

Instead of a separate connector body with end nuts as in the illustrated embodiment, the same feedthrough end seal and epoxy assembly may be used to seal a simple feedthrough or bore in a high pressure barrier, such as the wall 70 or lid of an underwater equipment housing, as illustrated in FIG. 8.

The wall 70 has a through bore 72 for feedthrough of fibers and/or electrical wires into the housing for connection to instruments in the housing. A suitable feedthrough connector 74 is secured in through bore 72 and also has a through bore 75 for receiving fibers 76 or electrical wires. Through bore 76 has an enlarged seat portion 78 for receiving feedthrough seal member 18. The seal member structure is identical to that of the previous embodiment, and like reference numerals have been used for like parts as appropriate. As in the previous embodiment, the seal member 18 may be of rigid or semi-rigid material and has an externally mounted O-ring seal 56 for sealing engagement in the seat portion 78. At least the through bore 55 of seal member 18 is filled with an epoxy material 60 which bonds to the inner surface of through bore 55 and to the fibers 76. The epoxy material 60 and the material of seal member 18 have substantially equal coefficients of thermal expansion and bulk moduli, so that the risk of loss of seal as a result of thermal shock or pressure cycling at the high pressure barrier is substantially reduced. The epoxy material may extend into the remainder of the bore 75 in connector 74 and need not be confined to the seal member bore 55, making assembly relatively easy.

Thus, the end seal assembly of this invention allows conductors to be passed sealably through high pressure barriers such as instrument housings. The end seal assembly may be mounted directly in a rigid metal bore of the housing through which the conductors pass, or may be mounted in a fiber management chamber associated with either a connector or an instrument housing, and in which the end of a conductor-carrying cable or rigid tube is terminated.

Although a preferred embodiment of the invention has been described above by way of example only, it will be understood by those skilled in the field that modifications may be made to the disclosed embodiment without departing from the scope of the invention, which is defined by the appended claims.

We claim:

1. An end seal assembly for a passageway carrying one or more conductors, comprising:
    a seal member of a first material for seating in a passageway through which at least one conductor extends;
    the seal member having a through bore through which the conductor can extend; and
    epoxy material filling the through bore in the seal member for bonding to the through bore and to any conductors extending through the through bore;
    the first material having a coefficient of thermal expansion approximately equal to the coefficient of thermal expansion of the epoxy material and a bulk modulus substantially equal to the bulk modulus of the epoxy material.

2. The assembly as claimed in claim 1, wherein the seal member has an outer surface and a resilient seal is mounted on the outer surface for sealing engagement in a through bore.

3. The assembly as claimed in claim 2, wherein the resilient seal is an O-ring seal.

4. The assembly as claimed in claim 2, wherein the seal member has an annular groove in its outer surface and the resilient seal is mounted in said annular groove.

5. A feedthrough end seal assembly, comprising:
    a body having a feedthrough passageway for guiding at least one conductor through a high pressure barrier;
    at least one conductor extending through said feedthrough passageway;
    an end seal mounted entirely within said feedthrough passageway and having a through bore through which said conductor extends and;
    epoxy material filling said end seal and bonded to the end seal through bore and to the conductor;
    wherein the end seal is of a material having a bulk modulus substantially equal to the bulk modulus of said epoxy material.

6. The assembly as claimed in claim 5, wherein the conductor is an optical fiber.

7. The assembly as claimed in claim 5, wherein the conductor is an electrical wire.

8. The assembly as claimed in claim 5, wherein a plurality of conductors extend through the passageway and the end seal, and the epoxy material is bonded to all the conductors.

9. The assembly as claimed in claim 5, wherein the end seal is of a material having a coefficient of thermal expansion approximately equal to the coefficient of thermal expansion of the epoxy material.

10. The assembly as claimed in claim 5, including a resilient seal member mounted between the end seal and passageway to seal the passageway.

11. The assembly as claimed in claim 10, wherein the resilient seal member comprises an O-ring seal.

12. The assembly as claimed in claim 10, wherein the end seal has an outer cylindrical surface having an annular groove, and the resilient seal member is seated in said annular groove.

13. The assembly as claimed in claim 5, wherein said end seal is of glass fiber reinforced plastic material.

14. A tubular conduit end seal assembly, comprising:
    a tubular conduit having opposite first and second ends and a through bore extending between said ends;
    a cable extending into the first end of said conduit, the cable having an inner end terminating in said through bore;
    at least one conductor carried by said cable and extending out of the inner end of said cable, through said through bore, and out of the second end of said conduit;
    a first end seal in said through bore at the first end of said conduit for sealing said cable in the through bore;
    a second end seal in said through bore at the second end of said conduit for sealing the second end of the conduit while allowing the conductor to pass out of the second end of the conduit;
    the first end of said through bore having an inwardly tapered portion extending up to the cable outer diameter; and
    the first end seal comprising a grip bushing having a tapered outer surface at a taper matching that of the tapered portion of said first end of the through bore, and a pointed end portion for gripping into said cable to seal said cable in said first end of said through bore.

15. The assembly as claimed in claim 14, further comprising a fastener nut releasably securable over the first end of said conduit, the fastener nut having an inner end face for bearing against said grip bushing to urge said grip bushing into gripping engagement with said cable.

16. The assembly as claimed in claim 15, wherein said first end seal further comprises a jam bushing engaging over said cable between said inner end face of said fastener nut and said jam bushing for urging said grip bushing into the tapered first end of the through bore, whereby said grip bushing bites into and grips the cable.

* * * * *